Thomas H. Shepherd

3,428,043
BANDAGE CONTAINING ABSORBED THERAPEUTIC MATERIALS

Thomas H. Shepherd, Princeton, N.J., assignor to National Patent Development Corporation, New York, N.Y., a corporation of New York
Filed June 9, 1966, Ser. No. 556,422
U.S. Cl. 128—268  5 Claims
Int. Cl. A61f 7/02; A61l 15/04

ABSTRACT OF THE DISCLOSURE

Hyrdophilic hydrogel material compatible with body tissue containing medication absorbed therein is reinforced with a coextensive sheet of fabric to provide a bandage.

---

This invention relates to therapeutic devices, and more particularly to a bandage having a self-contained supply of medication.

It is known that certain hydrophilic hydrogel materials, such as those disclosed in United States Patents, Nos. 2,976,576 and 3,220,960, granted to Otto Wichterle on Mar. 28, 1961 and Nov. 30, 1965, respectively, have the ability, when in an anhydrous state, of absorbing large quantities, in relation to volume, of therapeutic liquid solutions such as antiseptics, antibacterial agents, disinfectants, sterilizers, or other medications.

These materials have the further characteristic that when the volatile solvents within which the therapeutic materials are dissolved or suspended, are removed, as by heating and/or drying, the therapeutic materials themselves will remain absorbed within the hydrogel material for long periods of time if stored in the dried condition.

Therefore, a thin flexible sheet of hydrophilic hydrogel material may be prepared containing any of such therapeutic materials by placing a sheet of the hydrogel in a therapeutic solution for time sufficient for the solution to be absorbed therein. Thereafter, the hydrogel may be removed from the solution and converted to its anhydrous state either by heating and/or drying to remove the volatile solvents. The therapeutic materials however will remain absorbed within the sheet and the sheet can be stored in its anhydrous state.

When needed the sheet may be prepared for use merely by soaking it in the proper solvent liquid to reactivate the original therapeutic solution.

Therefore, it is an object of the present invention to provide therapeutic material in the form of a bandage containing a therapeutic agent which, when soaked in the appropriate solvent, will cause the therapeutic agent to be released from the bandage such that it can be placed on a wound or otherwise used for for treatment where the use of a bandage is appropriate.

Other objects and advantages will be apparent to those skilled in the art after reading the following specification in connection with the annexed drawings, in which.

Figure 1:
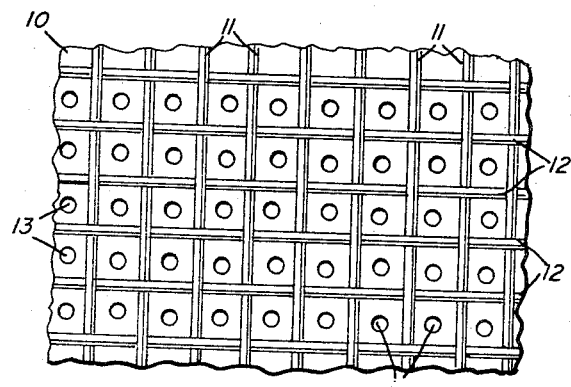
FIGURE 1 is a plan view of a portion of a bandage made in accordance with the teachings of this invention.
Figure 2:
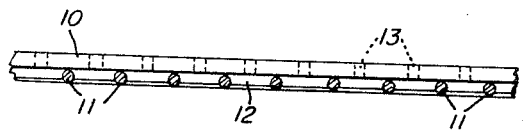
FIGURE 2 is a cross-section of the bandage shown in FIGURE 1.

In FIGURES 1 and 2, there is shown a thin sheet of hydrophilic hydrogel material made in accordance with the teachings of the aforementioned United States patents, indicated by numeral 10. In the anhydrous state such materials are hard and brittle but when saturated with liquids such as water or alcohol solutions, the material becomes soft, flexible and limp and structurally is prone to tearing when stretched. For this reason a reinforcing material is preferably combined with the hydrogel material and one such reinforcing material may be a woven fabric of any suitable inert material such as Dacron filaments or threads 11 and 12 preferably woven in an open mesh resembling gauze. This reinforcing material may be adhered to one side of the hydrogel material as shown in FIGURE 2 and in order to permit ventilation of the area to be covered by the bandage, the hydrogel material itself is preferably provided with a plurality of perforations 13.

Figure 3:
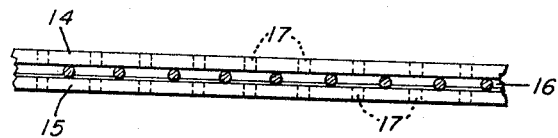
FIGURE 3 is a cross-section of a modified form of the invention.

In the form of the invention shown in FIGURE 3, two thin sheets of hydrogel material 14 and 15 are adhered, one on each side of a reinforcing material such as a fabric 16. The advantage of this construction is that both sheets may contain a therapeutic solution and thus it will be brought directly in contact with the skin regardless of which side of the bandage faces the affected area. As with the first modification the sheets of hydrogel material may be perforated as indicated by numeral 17 to permit passage of air.

Figure 4:
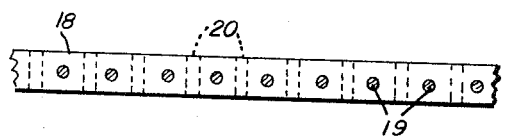

Still another form of the invention is illustrated in FIGURE 4, in which example a relatively thick sheet of hydrogel material 18 has been formed to include a reinforcing material such as fabric 19 completely contained therein and surrounded thereby. Such a type of construction could be accomplished by molding the hydrogel in powdered form under heat and pressure in a suitable mold within which the reinforcing material has been deposited with the hydrogel. The bandage disclosed in FIGURE 4 could also be made by taking two sheets of hydrogel material, as in FIGURE 3, together with reinforcing material between them and passing the layers of material between rolls to fuse the material into a composite film. Perforations 20 could be produced during the molding or rolling operations or by means of a conventional punching operation after the composite material has been formed.

In all of the forms of the invention disclosed above, the hydrogel material may be immersed in a solution containing therapeutic material. As an example, merbromin dissolves in alcohol to make a solution known commercially as Mercurochrome. When the hydrogel material has become saturated with such a solution, the bandage containing the absorbed solution is removed and dried to remove the alcohol leaving the merbromin behind in the hydrogel material and, so long as the bandage is maintained in a completely dry atmosphere the merbromin will remain available for use at a later time.

When the bandage is needed all that is necessary to do is to immerse it in a proper solvent, which in this case would be an alcohol, and the merbromin solution will be recreated to become available when the bandage is applied to the patient.

The invention may also be used as a selective carrier of several agents rather than as a carrier of a single one. Thus, a bandage containing both iodine and merbromin may be practiced, it will be obvious to those skilled in are freely soluble in each other, a combined solution may be made up containing merbromin in water and iodine in alcohol and the hydrogel material in the form of a bandage, as previously described, may be immersed in this solution.

When the bandage is removed and dried both the iodine and merbromin will remain absorbed in the hydrogel material for later use. If it is desired to apply iodine the bandage can be placed in a solution of alcohol to recreate the iodine solution and to cause its release more readily than merbromin when applied to a surface. On the other hand if the merbromin is the major desired medicant, the hydrogel bandage may be immersed in water to recreate the merbromin solution and release it as desired. Finally, both iodine and merbromin could be released by soaking the prepared hydrogel bandage in a solution of water and alcohol.

While only two therapeutic solutions have been described, it is obvious that a complete listing of all possible solutions available would be impossible and it should be understood that the invention is not limited to the use of particular therapeutic materials but can be practiced with any form of soluble medication.

Having disclosed several forms in which the invention may be practiced, it will be obvious to those skilled in the art that modifications and improvements may be made which would come within the scope of the annexed claims.

I claim:

1. A bandage for therapeutic use comprising a sheet of nonswollen, mechanically workable infrequently crosslinked hydrophilic polymeric material having a therapeutic material absorbed therein, and a coextensive laminate of flexible sheet fabric reinforcing material combined with said first sheet.

2. A bandage as defined in claim 1, wherein one side of said second sheet is adhered to one side of said first sheet.

3. A bandage as defined in claim 2, wherein a second sheet of hydrophilic polymeric material is adhered to the other side of said second sheet.

4. A bandage as defined in claim 1, wherein said reinforcing fabric is wholly contained within said sheet of hydrophilic polymeric material.

5. A bandage as defined in claim 1, wherein said fabric is of open-mesh construction, and the hydrophilic polymeric material is provided with a plurality of perforations.

References Cited

UNITED STATES PATENTS

| | | | |
|---|---|---|---|
| 2,976,576 | 3/1961 | Wichterle | 264—49 |
| 3,220,960 | 11/1965 | Wichterle et al. | 260—2.5 |
| 3,263,680 | 8/1966 | Morgan | 128—132 |
| 3,287,222 | 11/1966 | Larde et al. | 167—84 |

ADELE M. EAGER, *Primary Examiner.*

U.S. Cl. X.R.

128—156